United States Patent
Fulev et al.

(10) Patent No.: US 11,124,623 B2
(45) Date of Patent: Sep. 21, 2021

(54) METHOD FOR PRODUCING POLYOL DISPERSIONS FROM POLYURETHANE WASTE AND USE THEREOF

(71) Applicant: H & S Anlagentechnik GmbH, Sulingen (DE)

(72) Inventors: Stanislav Fulev, Dupnitsa (BG); Valentin Stoychev, Wildau (DE); Marin Boyadzhiev, Teltow (DE)

(73) Assignee: H & S Anlagentechnik GmbH, Sulingen (DE)

(*) Notice: Subject to any disclaimer, the term of this patent is extended or adjusted under 35 U.S.C. 154(b) by 100 days.

(21) Appl. No.: 16/461,679

(22) PCT Filed: Nov. 16, 2017

(86) PCT No.: PCT/EP2017/079399
§ 371 (c)(1),
(2) Date: May 16, 2019

(87) PCT Pub. No.: WO2018/091568
PCT Pub. Date: May 24, 2018

(65) Prior Publication Data
US 2021/0017354 A1    Jan. 21, 2021

(51) Int. Cl.
| C08J 11/26 | (2006.01) |
| C08G 18/08 | (2006.01) |
| C08G 18/32 | (2006.01) |
| C08G 18/48 | (2006.01) |

(52) U.S. Cl.
CPC ........... *C08J 11/26* (2013.01); *C08G 18/3206* (2013.01); *C08G 18/4829* (2013.01); *C08G 2110/0025* (2021.01); *C08J 2375/04* (2013.01)

(58) Field of Classification Search
CPC ... C08J 11/26; C08J 2375/04; C08G 18/3206; C08G 18/4829; C08G 2110/0025; Y02W 30/62
See application file for complete search history.

(56) References Cited

U.S. PATENT DOCUMENTS 5,410,008 A    4/1995    Bauer

FOREIGN PATENT DOCUMENTS

| CN | 103756285 A | * | 4/2014 | |
| DE | 3435014 A1 | | 3/1986 | |
| DE | 4024601 C1 | | 5/1991 | |
| DE | 19512778 C1 | * | 12/1996 | ........... C08G 18/638 |
| DE | 19512778 C1 | | 12/1996 | |
| DE | 102013106364 A1 | * | 12/2014 | ................ C08J 9/02 |
| DE | 102013106364 A1 | | 12/2014 | |
| RU | 2143442 C1 | | 12/1999 | |
| RU | 2304593 C1 | | 8/2007 | |
| WO | 2015/171432 A1 | | 11/2015 | |

OTHER PUBLICATIONS

International Search Report and the Written Opinion of the International Searching Authority, dated Mar. 12, 2018, from related PCT/EP2017/079399, filed on Nov. 16, 2017. German with English translation of the ISR.
Ionescu, M., "Chemistry and Technology of Polyols for Polyurethanes," Chapters 3, 8 and partial Chapter 12, pp. 31-53; 263-294 and 317. Copyright 2005, Rapra Technology Limited, Shawbury, Shrewsbury, Shropshire, SY4 4NR, United Kingdom; http://www.rapra.net.
Olabisi, O., Ed., "Handbook of Thermoplastics," p. 418. Published 1997 by Marcel Dekker, Inc., N.Y.

* cited by examiner

*Primary Examiner* — Kara B Boyle
(74) *Attorney, Agent, or Firm* — Preti Flaherty Beliveau & Pachios LLP; Carolyn M. Gouges d'Agincourt

(57) ABSTRACT

The invention relates to a method for producing isocyanate-reactive polyol dispersions from polyurethane waste as well as to the use of an isocyanate-reactive polymer dispersion obtained according to the claimed method, for producing polyurethane materials, (in particular rigid polyurethane foam materials).

10 Claims, No Drawings

METHOD FOR PRODUCING POLYOL DISPERSIONS FROM POLYURETHANE WASTE AND USE THEREOF

The present invention relates to a process for producing isocyanate-reactive polyol dispersions from polyurethane waste and also the use of an isocyanate-reactive polyol dispersion obtainable by the process of the invention for producing polyurethane materials (in particular rigid polyurethane foam materials).

Some millions of used mattresses are disposed of each year in Germany. These post-consumer mattresses contain, depending on the composition, useful amounts of polyurethane foam (PUR), high-resilience (HR) PUR foam, PUR viscofoam, synthetic or natural latex and steel springs. In addition there are fibers, textiles and wood elements and also undesirable constituents such as mold, bacteria, dust mites, skin flakes and viruses. In view of the tremendous quantity of used mattresses to be disposed of (in Germany alone 20 000 metric tons arise every year), and the legal obligations to take back used mattresses (e.g. in France and Belgium), there is the necessity of returning the mattresses back into the raw materials circuit in an ecological and economical process. The situation with regard to other polyurethane waste from the post-consumer sector is similar: in automobile seats or furniture, e.g. sofas, and in further consumer articles such as cushions, upholstery, rests, PTC, too, appreciable quantities of polyurethane materials are processed and disposed of by the end consumer after use is finished. These materials, too, should as far as possible be returned to the raw materials circuit in a very ecological and economical process.

It is an object of the present invention to provide a new process for producing isocyanate-reactive recycled polyols, in which the recycled polyols obtained are suitable for producing, in particular, rigid polyurethane foams. Very little presorting of the starting materials should preferably be required here.

It is known that polyurethanes (PUR) can be converted by chemical reaction into isocyanate-reactive, liquid products.

According to the prior art, not only the chemical conversion of polyurethanes (PUR) by means of water (hydrolysis) but also processes using amines (aminolysis), acids (acidolysis) or alcohols (alcoholysis) have been proposed in order to convert polyurethanes (PUR) into recycled polyols.

The alcoholysis of PUR is based on an equilibrium reaction in which superstoichiometric amounts of hydroxyl groups in the form of diols and/or triols are required for cleavage of the urethane groups.

The dissolution of polyurethane waste in glycols (glycolysis) at elevated temperature and precipitation of the amines by means of hydrogen chloride is described in U.S. Pat. No. 4,035,314 A.

Another variant, namely dissolution of polyurethane waste in diols, precipitation of the amines by means of halogenated esters of phosphoric acid, removal of the amine salts and reaction with isocyanates, is taught in U.S. Pat. No. 4,044,046 A.

The catalysis of the reaction with glycols is described in DE 2 238 109 A, DE 2 557 172, DE 2 711 145 A and DE 2 834 431. The typical transesterification catalysts, e.g. amino alcohols, metal carboxylates, hydroxides and alkoxides and Lewis acids, have been found to be effective catalysts in the glycolysis.

The polyols produced by the known alcoholysis process are suitable for the production of rigid PUR foams because of the relatively high hydroxyl equivalent, but the polyurethane waste has to be sorted according to chemical composition.

In the aminolysis of polyurethanes, a rapid reaction proceeds at a comparatively low temperature. Two phases are formed in the reaction mixture as a result of this reaction, namely a low-viscosity polyol phase and a hard oligourea phase. The polyol phase can be directly reacted again with a diisocyanate and/or polyisocyanate to give a product very similar to the original polyurethane. If, for example, a cold-cure molded flexible foam and a dipropylenetriamine are used in the cleavage, a cold-cure molded flexible polyurethane foam can be produced again by simple reaction of the polyol phase obtained with water and a polyaryl polyisocyanate.

The lower phase, consisting of oligourea (about 40%), is unfortunately unusable (without further reaction steps).

DE 195 12 778 C1 proposes the production of recycled flexible foam polyols by solvolysis of polyurethane waste in a degradation reaction with cyclic dicarboxylic anhydrides such as succinic anhydride, glutaric anhydride, malic anhydride, phthalic anhydride, dihalogenated phthalic anhydrides, tetrahalogenated phthalic anhydrides and the Diels-Alder adducts of maleic anhydride or the dicarboxylic acids on which these anhydrides are based or derivatives thereof in the presence of polyetherols having a molar mass of from 500 to 6000 g/mol and a hydroxyl functionality of from 2 to 5 at a temperature of from 140° C. to 250° C., with the polyetherols being subjected to a free-radical grafting reaction before, during or after the degradation reaction with carbon-unsaturated monomers containing carbonyl groups. According to the examples described, the process of DE 195 12 778 C1 leads to isocyanate-reactive polyol dispersions which, although they have a relatively low hydroxyl number, still have a comparatively high acid number of always above 5 mg KOH/g. However, an acid number of over about 2 mg KOH/g incurs the risk of an adverse effect on the blowing and gelling catalysts necessary for producing flexible polyurethane slabstock foam, through to blocking of these catalysts. The recycled polyols described in DE 195 12 778 C1 are therefore disadvantageous.

DE102013106364A1 describes a process for producing a polyurethane slabstock foam by acidolysis of polyurethane waste in a reaction with at least one dicarboxylic anhydride and a grafted polyol. In order to produce a high-quality recycled polyol suitable for producing original PUR slabstock foam, a specific duplex steel is used for this purpose.

It is also an object of the present invention to provide a new process for producing stable isocyanate-reactive recycled polyols by chemical degradation of mixed polyurethane post-consumer waste, in which the recycled polyols are, in particular, suitable for producing rigid polyurethane foams. It was preferred that one, more than one or all of the above-described disadvantages of the prior art would be overcome.

According to the invention, this object is achieved by a process for producing isocyanate-reactive polyol dispersions from polyurethane mattress waste from the post-consumer sector in the presence of polyetherols, characterized in that, in a first reaction step, a) the polyurethane waste is firstly reacted with a reaction mixture containing at least one dicarboxylic acid or dicarboxylic acid derivative, in particular a dicarboxylic anhydride, and
at least one polyetherol (polyether polyol) having an average molar mass of from 400 to 6000 g/mol and a hydroxyl functionality of from 2 to 4 and preferably at least one free-radical former suitable for initiating a free-radical polymerization
at temperatures of from 170° C. to 210° C., preferably up to 200° C., more preferably from 175° C. to 190° C., to form a dispersion;
and, in a second reaction step,
b) the dispersion obtained under a) is reacted again with at least one short-chain diol having from 2 to 8 carbon atoms and/or a short-chain triol having from 2 to 8 carbon atoms
at temperatures of from 180° C. to 230° C., preferably from 195° C. to 220° C., to give an isocyanate-reactive polyol dispersion.

For the purposes of the present invention, waste from the post-consumer sector is, in particular, polyurethane materials which are envisaged for disposal by the end consumer. These materials preferably comprise polyurethane foam (PUR), high-resilience (HR) PUR foam, PUR viscoelastic foam and/or other PUR foams. In principle, polyurethane waste from the post-consumer sector can be waste having the appropriate composition which was used in any suitable function by the end consumer or likewise had been able to be used by an end consumer. Preferred polyurethane waste is waste originating from cushions, upholstery and very particularly preferably from mattresses. Particularly preferred polyurethane waste for the purposes of the present invention also encompasses complete or largely complete mattresses.

The process of the invention is a process which can be described as acidolysis followed by a glycolysis (combined acidolysis-glycolysis) for producing isocyanate-reactive recycled polyols from polyurethane waste in the presence of polyetherols, in which, in a first reaction phase, the mixed polyurethane post-consumer waste is reacted with a reaction mixture containing at least one dicarboxylic anhydride and at least one grafted polyetherol having a molar mass of from 400 to 6000 g/mol, preferably from 400 to 4000 g/mol and more preferably from 500 to 3000 g/mol, and a hydroxyl functionality of from 2 to 4 and preferably at least one free-radical former suitable for initiating a free-radical polymerization.

Preferred criteria for the polyether polyols to be used: secondary hydroxyl groups and/or no additives having an antioxidative effect (antioxidant or antioxidation agent) and/or no fillers (SAN etc.). It has surprisingly been found that recycled polyols which have good product properties can be obtained from polyurethane waste by means of the process of the invention and that very much less presorting of the polyurethane waste is necessary for this purpose than in the case of the processes known from the prior art (see also further below).

The invention thus provides a process for the direct production of stable, in particular final or ready-to-use, isocyanate-reactive recycled polyols by chemical degradation of polyurethane waste. In particular, recycled polyols (recycling polyols) which contain only a very small amount of unreacted acid groups are obtained, which, for example, allows the subsequent production of rigid polyurethane foam.

It is in principle possible for step b) in the process of the invention to proceed partly in parallel with step a).

The process of the invention gives recycled polyols whose hydroxyl equivalent or hydroxyl functionality is in the range of the polyetherols which can be used for producing relatively hard crosslinked rigid polyurethane foams.

The process of the invention thus makes it possible for the first time to obtain the properties of recycled polyols from polyurethane post-consumer waste by a direct route, for example those which have been used for producing rigid polyurethane foam panels with flexible or rigid covering layers.

All polyurethane waste based on flexible to semi-rigid polyurethanes from the post-consumer sector are, in particular, suitable for the process of the invention. These can optionally be polyurethanes mixed with other polymers and/or fillers, for example those based on polyether or polyester, and also polyureas and copolymers thereof. The process and use aspects of the polyurethanes used, for example whether they contain fillers and additives, or are solid or foamed, are of no consequence for the process of the invention. However, for process-related reasons, preference is given to using polyurethane waste which is free of textiles, steel, wood and other foreign materials and is in comminuted form. The degree of comminution can be chosen at will and merely influences the speed of the degradation reaction.

Flexible polyurethanes are, for the purposes of the present invention, polyurethanes which have an open cell structure and a hardness of from 300 to 500 N at 40% loading measured in accordance with SS-EN ISO 2439:2008(E) and also have an elasticity of from 25 to 60% (measured in accordance with EN ISO 8307).

Semi-rigid urethanes are materials which have an open cell structure but have a compressive strength of at least 100 kPa measured in accordance with EN ISO 844:2009.

The process of the invention is also suitable for polyurethanes which are associated with thermoplastic polymers, e.g. polyolefins, ABS or PVC, or can be separated from these only with difficulty. Such thermoplastics can be filtered out from the recycled polyol after the reaction.

The abovementioned polyurethane waste is preferably used in a total amount of from 35 to 60% by weight, preferably 35-45% by weight, based on the total mass of all constituents (starting materials) used in step a) of the process of the invention.

Preference is given to using dicarboxylic acids and/or dicarboxylic anhydrides, including cyclic dicarboxylic anhydrides, for the solvolysis in step a) in the process of the invention. These degrading agents are preferably selected from the group consisting of adipic acid, succinic anhydride, glutaric anhydride, malic anhydride, phthalic anhydride, maleic anhydride, dihalogenated and tetrahalogenated phthalic anhydrides, for example dichlorophthalic and tetrachlorophthalic anhydride or dibromophthalic and tetrabromophthalic anhydride. Mixtures of these compounds can likewise be used according to the invention.

Particular preference is given to using a dicarboxylic acid selected from the group consisting of adipic acid, maleic acid, phthalic acid and succinic acid and derivatives thereof.

The abovementioned dicarboxylic anhydrides and/or dicarboxylic anhydrides formed in-situ from the dicarboxylic acids on which these anhydrides are based and/or derivatives thereof are preferably used in a total amount of from 5 to 25% by weight, preferably from 10 to 25% by weight, based on the total mass of the starting materials in step a) of the process of the invention.

In order to start or accelerate the chemical reaction of polyurethane groups with the abovementioned dicarboxylic anhydrides, i.e. to activate the reaction mixture, at least one free-radical former suitable for initiating a free-radical polymerization is preferably added. As suitable free-radical formers, preference is given to adding customary peroxidic compounds. Such a peroxidic compound can be an inorganic peroxide, preferably hydrogen peroxide, and/or an organic peroxide, preferably tert-butyl hydroperoxide, tert-amyl hydroperoxide, 1,1,3,3-tetramethylbutyl hydroperoxide and/or cumene hydroperoxide.

The abovementioned peroxides are preferably used in a total amount of from 0.1 to 5% by weight, preferably from 2 to 5% by weight, based on the total amount of the starting materials in steps a) and b) together of the process of the invention.

In order for a reactive isocyanate-reactive polyol dispersion in which essentially no free acid groups are allowed to be present to be obtained in the end, the hydroxyl equivalent or the hydroxyl functionality of the recycled polyol is preferably additionally adjusted or increased. For this reason, an amount of at least one short-chain diol and/or short-chain triol is also added to the reaction mixture in step b), in particular in order to bind any residual amounts of acid groups still present. Here, the term short-chain diol and/or triol means, in particular, a diol and/or a triol having from 2 to 8 carbon atoms, in the case of the triol preferably from 3 to 8 carbon atoms.

The short-chain diol and/or triol can preferably be selected from the group consisting of ethylene glycol (glycol), dipropylene glycol, 1,3-propane glycol, 1,2-butanediol, 1,4-butane glycol and glycerol. The diol and/or triol is preferably selected from the group consisting of ethylene glycol (glycol), dipropylene glycol and glycerol.

The dispersion obtained is, according to the invention, reacted with a total amount of from 1.0 to 30% by weight and particularly preferably from 3 to 12% by weight, in each case based on the starting materials used in step b) of the process of the invention, of at least one short-chain diol and/or at least one short-chain triol, i.e. a diol and/or triol as mentioned above, to give an in particular ready-to-use isocyanate-reactive polyol dispersion.

According to the invention, the process of the invention is preferably carried out, at least in reaction step a), in a vessel made of stainless steel.

These materials ensure that the reaction can proceed uninfluenced by the material of the vessel.

On the basis of what has been said above, particular preference is given to a process according to the invention in which, based on the total mass of the starting materials in reaction steps a) and b) together as 100% by weight, reaction step a) is carried out using
- the polyurethane post-consumer waste in a total amount of from 30 to 60% by weight and/or
- the at least one polyetherol in a total amount of from 20 to 45% by weight, preferably having a molar mass of from 400 to 3000 g/mol and a hydroxyl functionality of from 2 to 4 and/or
- the at least one dicarboxylic acid or the at least one dicarboxylic acid derivative, in particular as dicarboxylic anhydride, in a total amount of from 5 to 25% by weight; and/or
- the at least one free-radical former suitable for initiating a free-radical polymerization, preferably a peroxide, in a total amount of from 0.1 to 5% by weight and/or, in reaction step b), at least one short-chain diol having from 2 to 8 carbon atoms and/or at least one short-chain triol having from 2 to 8 carbon atoms is added in a total amount of from 1.0 to 30% by weight and particularly preferably from 3 to 12% by weight to the dispersion obtained under a).

Further preference is given to a process according to the invention in which the polyurethane post-consumer waste is introduced into the reaction mixture which has been heated to from 175° C. to 190° C. in reaction step a) in such a way that the temperature is maintained in the range from 185° C. to 195° C. during the reaction in reaction step a).

Particularly good products can be achieved by means of this procedure. Preference is also given to a process according to the invention in which the temperature is increased to >195° C. to 210° C. after reaction step a) and the temperature is then kept in the range from 205° C. to 230° C. during the reaction in reaction step b).

These measures, too, improve the quality of the products formed. Another part of the invention is the use of an isocyanate-reactive polyol dispersion obtainable by a process according to the invention for producing polyurethane materials, preferably rigid polyurethane foam materials, wherein the polyol obtainable from the process of the invention (recycled polyol) is preferably used together with a base polyol (freshly produced, i.e. not recycled polyol) in a ratio of from 10:90 to 40:60.

Owing to the good qualities of the recycled polyol which can be obtained from the process of the invention, comparatively large proportions of the product obtained can be used in the production of high-quality polyurethane materials. The ratios specified are ratios by weight.

For the purposes of the present invention, rigid polyurethane foam materials are materials which, in the region of the polyurethane, have a closed cell structure and a compressive strength of at least 100 kPa measured in accordance with EN ISO 844:2009.

One embodiment of the process of the invention for producing isocyanate-reactive polyol dispersions is characterized in that after the reaction of the reaction mixture with the polyurethane waste, the resulting dispersion is heated to temperatures of up to 230° C. to effect reaction.

In choosing the reaction apparatus and working equipment, it has to be taken into account that the solvolysis takes place in the presence of acids and oxidants. Accordingly, the entire reaction apparatus and periphery is preferably made of corrosion- and acid-resistant stainless steel.

The following examples illustrate the invention. All percentages indicated are percentages by weight, based on the total mass of the starting materials used, unless indicated otherwise. The chemicals used were, unless indicated otherwise, in each case used as technical grade chemicals.

Example 1

35% by weight of a polyether triol (Dow Chemical Company, VORANOL CP 755) having an average molar mass of 700 g/mol were placed together with 15% by weight of phthalic acid, 5% by weight of maleic acid and an amount of 3% by weight of hydrogen peroxide (50% strength) in a stainless steel reactor and heated to 170° C. over a period of 120 minutes.

From this temperature, 40% by weight of waste composed of polyurethane post-consumer mattresses (unsorted, shredded to a size of about 2×2×2 cm) were added in such a way that the temperature was maintained in the range from 180° C. to 190° C. until the polyurethane materials had been dispersed.

The temperature was then increased to 210° C. and the mixture was stirred for two hours and, while stirring, 2% by weight of short-chain glycol (diethylene glycol) was then added in such a way that the temperature was maintained in the range from 205° C. to 220° C.

The mixture was stirred for a further one hour at a temperature of 210° C. (220) and then cooled while stirring to 80° C. The recycled polyol was then pumped off, filtered through a 250 μm self-cleaning filter and cooled to room temperature.

This gave a recycled polyol in which the acid number is reliably below 1.5 mg KOH/g and the content of primary aromatic amines was always below 0.05% by weight.

The product had the following property profile: (specification)

Hydroxyl number: 200 mg KOH/g, measured in accordance with DIN 53240

Acid number: 1.0 mg KOH/g, measured in accordance with DIN 53402

Viscosity: 2400 m Pa·s at 25° C., measured in accordance with DIN 53019

Amine number: 8 mg KOH/g, measured in accordance with DIN 53176

This recycled polyol is suitable for producing rigid polyurethane foam.

Example 2

35% by weight of a long-chain polyether triol (Lupranol® 3300, BASF) having an average molar mass of 420 g/mol were placed together with 14% by weight of phthalic acid, 1% by weight of maleic acid, 1% by weight of acrylic acid and an amount of 3% by weight of tert-butyl hydroperoxide (PEROXAN BHP-70-PERGAN GmbH) in a stainless steel reactor and heated to 180° C. over a period of 120 minutes.

At this temperature, 40% by weight of waste composed of polyurethane post-consumer mattresses (unsorted, shredded to a size of about 2×2×2 cm) as were added in such a way that the temperature was maintained in the range from 180° C. to 190° C. until the polyurethane materials had been dispersed.

The mixture was then stirred for two hours and 6% by weight of short-chain glycol (diethylene glycol) was subsequently added in such a way that the temperature was kept in the range from 205° C. to 210° C.

The mixture was stirred for a further one hour at a temperature of 210° C., 2% by weight of dipropylene glycol was subsequently added and the mixture was maintained at 220° C. for a further 30 minutes and then cooled to 80° C. while stirring. The recycled polyol was then pumped off, filtered as in example 1 and cooled to room temperature.

The product had the following property profile:

Hydroxyl number: 265 mg KOH/g

Acid number: 0.5 mg KOH/g

Viscosity: 4500 m Pa·s at 25° C.,

Amine number: 16 mg KOH/g, in each case measured as in example 1.

The acid number was further decreased by the use of a short-chain glycol (dipropylene glycol). A negative influence on the catalysis in the subsequent production of rigid polyurethane foam is thereby avoided.

The process of the invention makes it possible for the first time to match, in a direct way, the properties of recycled polyols to the polyols which were used for the production of the original polyurethanes or polyurethanes used here in reprocessing. Particularly in the case of flexible polyurethanes, this has not been possible using the processes known hitherto.

Example 3

A number of foaming experiments for producing rigid polyurethane foam panels were carried out using recycled polyols produced according to the invention. In these foaming experiments, polyols were used in a weight ratio of rigid foam base polyol/recycled polyol (example 1 or 2) of from 90/10 to 60/40. Formulations customary for the production of rigid polyurethane foam panels were used and 7 industrial foaming tests at a foam density of from 28 kg/m³ to 60 kg/m³ were carried out.

It was possible to produce rigid PUR foam panels without the properties of the PUR products produced from base polyol/recycled polyol being changed to a significant negative extent compared to corresponding original PUR products, i.e. compared to PUR products without addition of recycled polyol. The properties of the panels, e.g. compressive strength, dimensional stability and thermal conductivity, of the products was thus comparable or equally good.

The invention claimed is:

1. A process for producing isocyanate-reactive polyol dispersions from polyurethane waste from a post-consumer sector in the presence of polyetherols, characterized in that, in a first reaction step,
   a) the polyurethane waste is firstly reacted with a reaction mixture containing at least one dicarboxylic acid or dicarboxylic acid derivative and
      at least one polyetherol having an average molar mass of from 400 to 6000 g/mol and a hydroxyl functionality of from 2 to 4,
      at temperatures of from 170° C. to 210° C. to form a dispersion;
   and, in a second reaction step,
   b) the dispersion obtained under a) is reacted again with at least one short-chain diol and/or one short-chain triol at temperatures of from 180° C. to 230° C. to give an isocyanate-reactive polyol dispersion.

2. The process for producing isocyanate-reactive polyol dispersions as claimed in claim 1, characterized in that the at least one polyetherol has the average molar mass of from 400 to 4000 g/mol.

3. The process for producing isocyanate-reactive polyol dispersions as claimed in claim 1, characterized in that the at least one dicarboxylic acid is selected from the group consisting of adipic acid, maleic acid, phthalic acid and succinic acid or derivatives thereof.

4. The process for producing isocyanate-reactive polyol dispersions as claimed in claim 1, characterized in that the at least one short-chain diol and/or one short-chain triol is selected from the group consisting of ethylene glycol, diethylene glycol, 1,3-propane glycol, 1,2-butanediol, 1,4-butane glycol and glycerol.

5. The process for producing isocyanate-reactive polyol dispersions as claimed in claim 1, characterized in that at least reaction step a) is carried out in a vessel made of stainless steel.

6. The process for producing isocyanate-reactive polyol dispersions as claimed in claim 1, wherein the reaction mixture of step a) further comprises a free-radical former which is an inorganic or organic peroxide.

7. The process for producing isocyanate-reactive polyol dispersions as claimed in claim 1, characterized in that, based on the total mass of the starting materials in reaction steps a) and b) together as 100% by weight, reaction step a) is carried out using
   the polyurethane post-consumer waste in a total amount of from 30 to 60% by weight and/or
   the at least one polyetherol in a total amount of from 20 to 45% by weight, and/or
   the at least one dicarboxylic acid or the at least one dicarboxylic acid derivative in a total amount of from 5 to 25% by weight; and/or
   at least one free-radical former suitable for initiating a free-radical polymerization in a total amount of from 0.1 to 5% by weight
   and/or, in reaction step b), at least one short-chain diol and/or one short-chain triol is added in a total amount of from 1.0 to 30% by weight to the dispersion obtained under a).

8. The process for producing isocyanate-reactive polyol dispersions as claimed in claim 1, characterized in that step a) is conducted at temperatures of from 185° C. to 195° C.

9. The process for producing isocyanate-reactive polyol dispersions as claimed in claim 1, characterized in that in step b) the dispersion obtained under a) is reacted again with at least one short-chain diol and/or one short-chain triol at temperatures from 195° C. to 230° C.

10. A method for producing a polyurethane material comprising reacting the isocyanate-reactive polyol dispersion obtained by the process according to claim 1 with an isocyanate to produce the polyurethane material.

* * * * *

UNITED STATES PATENT AND TRADEMARK OFFICE
CERTIFICATE OF CORRECTION

PATENT NO. : 11,124,623 B2
APPLICATION NO. : 16/461679
DATED : September 21, 2021
INVENTOR(S) : Stanislav Fulev, Valentin Stoychev and Marin Boyadzhiev It is certified that error appears in the above-identified patent and that said Letters Patent is hereby corrected as shown below:

In the Claims

Claim 9, Line 11: Delete "from 195° C. to 230° C." and replace with "from > 195° C. to 230° C."

Signed and Sealed this
Twenty-fourth Day of May, 2022

Katherine Kelly Vidal
*Director of the United States Patent and Trademark Office*